(12) United States Patent
Hendriks et al.

(10) Patent No.: US 6,751,021 B2
(45) Date of Patent: Jun. 15, 2004

(54) OPTICAL SCANNING DEVICE

(75) Inventors: Bernardus Hendrikus Wilhelmus Hendriks, Eindhoven (NL); Jeroen Wals, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 97 days.

(21) Appl. No.: 10/169,926

(22) PCT Filed: Nov. 8, 2001

(86) PCT No.: PCT/EP01/13045
§ 371 (c)(1),
(2), (4) Date: Jul. 10, 2002

(87) PCT Pub. No.: WO02/41303
PCT Pub. Date: May 23, 2002

(65) Prior Publication Data
US 2003/0169498 A1 Sep. 11, 2003

(30) Foreign Application Priority Data

Nov. 14, 2000 (EP) .............................. 00203998

(51) Int. Cl.⁷ .................................................. G02B 5/18
(52) U.S. Cl. ................. 359/566; 359/565; 359/569; 359/570; 369/94; 369/112.01

(58) Field of Search ................................. 359/565, 566, 359/569, 570, 571, 573, 575; 369/94, 109, 112.01, 112.05

(56) References Cited

U.S. PATENT DOCUMENTS 6,088,322 A * 7/2000 Broome et al. ........ 369/112.26

* cited by examiner

Primary Examiner—Drew Dunn
Assistant Examiner—Fayez Assaf
(74) Attorney, Agent, or Firm—Michael E. Belk

(57) ABSTRACT

The present invention provides a scanning device with the following features: the system is capable of writing data to record carriers of a first format because it is corrected for chromatic aberration resulting from fast wavelength variations during write operation; it has a diffractive element with a generally sawtooth-like pattern, such that it may for example be manufactured in a single-step replication process; the system has high efficiency for scanning first optical record carriers (e.g. DVDs) and acceptable efficiency for scanning second optical record carriers (e.g. CDs); and the lens provides limited spherochromatism and the system is thus able to cope with wavelength variations.

11 Claims, 2 Drawing Sheets

OPTICAL SCANNING DEVICE

Figure 1:
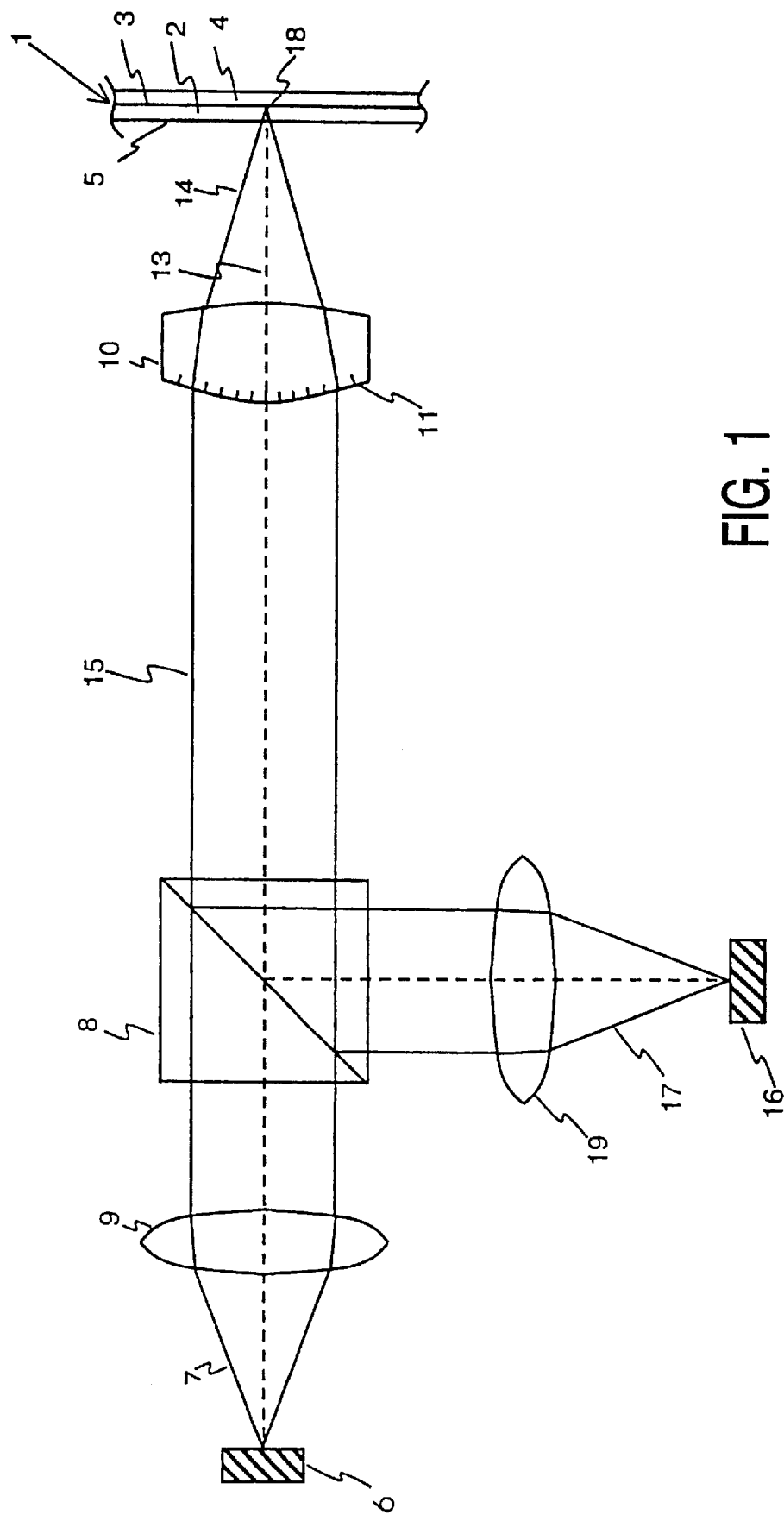

The present invention relates to an optical scanning device comprising an optical objective lens. More specifically, but not exclusively, the invention relates to an optical scanning device capable of writing and reading data from two different types of optical record carriers, such as compact discs (CDs) and digital versatile discs (DVDs), with laser radiation of a different wavelength, respectively, using the same optical objective lens system.

It is desirable for an optical scanning device to be capable of recording and reproducing optical record carriers of different formats. CDs are available, inter alia, as CD-As (CD-audio), CD-ROMs (CD-read only memory) and CD-Rs (CD-recordable). CDs are designed to be scanned with a wavelength of about 780 nm and a numerical aperture (NA) of 0.45, DVDs are designed to be scanned at a wavelength in the region of 660 nm. For reading DVDs an NA of 0.6 is generally used, whereas for writing DVDs an NA of 0.65 is generally required.

DVDs and CDs differ in the thickness of their transparent substrates, providing different information layer depths. The information layer depth for DVD is about 0.6 mm, whereas the depth for CD is about 1.2 mm. Thus if CDs are read with an optical scanning device with an objective lens optimised for DVD, a large amount of spherical aberration results at the information layer. It is possible to compensate for this effect when using a single objective lens system and a laser beam of 660 nm wavelength for reading both CD-ROMs and DVDs by reducing the numerical aperture (NA) for reading CD-ROMs from about 0.45 to 0.38, causing the spherical aberration to be within the limits for a proper reconstruction of the information stored on the CD-ROM. However, if in addition CD-Rs are to be scanned by the optical scanning device, a 780 nm laser beam has to be applied, because the CD-R is designed for writing and reading specifically at that wavelength. For CD-R organic dye is used as a recording film, of which the reflection characteristics change significantly with wavelength. It is difficult to achieve sufficient modulation for reflected radiation of 660 nm to reconstruct the information stored on a CD-R. Using a 780 nm laser beam and an NA of 0.45 for reading CDs with the same objective lens as used for DVD causes a large spherical aberration. Therefore the spherical aberration has to be compensated in some way in order to achieve an optical storage device capable of reading and/or recording CD-R, CD-ROM and DVD using laser radiation of 660 nm and 780 nm with a single optical objective lens.

Systems capable of reading DVD and CD by using laser radiation of different wavelength with the same objective lens are known in the art. WO 99/57720 describes such a system, which uses a moulded plastic lens having either two refractive aspheric surfaces or one aspherical surface and one refractive spherical surface including a diffractive element. The lens is capable of correcting for spherical aberration caused by the difference in thickness for the two disc formats as well as for chromatic aberration. However, the major drawbacks of applying plastic is its large temperature sensitivity and its large dispersion or, equivalently, low Abbe number. The refractive index change for plastic as a function of temperature is about ten times larger than for that glass. Large dispersion means large sensitivity to wavelength variation. In an optical storage device there are several sources of wavelength change: A spread in laser wavelength for mass produced lasers ($\Delta\lambda \approx \pm 5$ to $\pm 10$ nm), the bandwidth of the lasers ($\Delta\lambda \approx 2$ nm) and wavelength dependence on output power ($\Delta\lambda/dP \approx 0.2$ nm/mW).

Especially the last issue makes the application of refractive plastic lenses in rewritable systems very hard, if not impossible. During write operation, the laser switches from low power to high power in a few microseconds, causing defocus due to the wavelength change and dispersion. The mechanical bandwidth of a focus actuator is too low to compensate for this defocus, and, consequently, the data is not written properly. To avoid this problem glasses with high Abbe numbers are usually selected, which are in general expensive ones.

For conventional glass lenses, manufactured in a replication process the spread in laser wavelength is generally not a problem, since the lens actuator can generally compensate for the stationary defocus it introduces. In diffractive or hybrid lenses, on the other hand, this spread is a potential problem, because it not only leads to defocus, but also to spherochromatism and thus limits the performance of the lens.

WO 99/57720 also does not describe a system capable of writing data to optical record carriers of DVD format due to the numerical aperture of the objective lens: to properly write data at sufficient density to realise 4.7 Gbyte per disc, the NA has generally to be increased from 0.60 to 0.65. This increase in numerical aperture makes the design of an objective lens for a system capable of reading and writing data to DVD and scanning CD, which is corrected for spherical aberration, defocus due to fast wavelength variation and spherochromatism, much more difficult. High-NA lenses made of plastic material can only be realised with small radii of curvature and more than one aspherical surface, which makes the lens inherently more difficult and more expensive to manufacture.

In U.S. Pat. No. 5,349,471 a diffractive/refractive hybrid lens for use in an optical data storage system is described, which is made of a high dispersive glass with thus a low Abbe number. The resulting increased longitudinal chromatic aberration is compensated by the diffractive lens element. The described objective lens is for example able to correct for wavelength variations over a 20 nm wavelength range and up to 10 nm bandwidth of a laser diode. However, the lens is not capable of reading and writing data from optical record carriers of different thicknesses.

In U.S. Pat. No. 5,838,496 a diffractive multi-focal objective lens is described. A first focal point is formed by radiation of a lower diffractive order, whereas radiation of a higher diffractive order converges at a second focal point on the optical axis nearer to the lens than the first focal point. In addition the lens compensates for chromatic aberration and is thus capable of writing and reading data from optical discs with different thicknesses of the transparent substrate. However, the system is not designed for the use of radiation of two different wavelengths as it is needed to be able to scan data on DVD, CD-A, CD-R and CD-ROM formats with the same objective lens in an optical scanning device.

EP 936604 describes an optical pickup device suitable for reading and writing discs of DVD, CD-R and CD-ROM format with laser radiation of two different wavelengths. For this purpose an optical element having a first diffractive element in its central region and a second diffractive element with a different grating structure in its peripheral region is used in addition to an objective lens. A stepped grating profile has been chosen as a diffractive element. The central region of the optical element allows transmission of laser radiation of a first wavelength without any change and increases the diameter of laser radiation of a second wavelength. The peripheral region again allows transmission of laser radiation of the first wavelength without any change and simultaneously prevents the radiation of the second wavelength from contributing to the spot formation. In this way the NA for use of radiation of the second wavelength is reduced to a desired value.

It is a disadvantage of the system described that a stepped grating profile has been chosen which is usually manufactured in a photolithographic process. It is difficult to manufacture stepped grating profiles of small dimension in a replication process. It is a further disadvantage of the system described, that the additional optical element comprises two regions with different diffractive properties, which makes manufacturing of such a device more complicated.

It is an object of the invention to provide improved optical scanning devices for scanning optical record carriers.

According to one aspect of the present invention there is provided an optical scanning device for scanning first and second optical record carriers with a first and a second information layer depth by radiation of a first wavelength $\lambda_1$, and a second wavelength $\lambda_2$, respectively, wherein, preferably, 620 nm<$\lambda_1$<700 nm and 740 nm<$\lambda_2$<820 nm, said device being capable of reading and writing optical record carriers of said first format, the device including an objective lens (10) with at least one refractive element and at least one diffractive element (11) and with a numerical aperture NA of NA>0.60 for said first wavelength $\lambda_1$, said diffractive element including a pattern of generally sawtooth-like elements; wherein the diffractive and refractive properties of the objective lens are selected: such that radiation of said first wavelength is transmitted and focused on optical record carriers of said first thickness; such that radiation of said second wavelength is transmitted and focused on optical record carriers of said second thickness; and such that a variation in wavelength $\lambda_1$ of 5 nm results in spherochromatism below $0.03\lambda_1$.

In this way an optical scanning device is achieved capable of scanning data on record carriers of a first and second thickness with a first and second wavelength respectively. The objective lens is designed to change a parallel beam of wavelength $\lambda_1$ into a converging beam of NA>0.60, which ensures that the system is capable of writing data with a high density.

The present invention is capable of providing a scanning device with the following features:

the system is capable of writing data to record carriers of a first format because it is corrected for chromatic aberration resulting from fast wavelength variations during write operations;

it has a diffractive element with a generally sawtooth-like pattern, such that it may for example be manufactured in a single-step replication process;

the system has high efficiency for scanning first optical record carriers (e.g. DVDs) and acceptable efficiency for scanning second optical record carriers (e.g. CDs); and the lens provides limited spherochromatism and the system is thus able to cope with wavelength variations. Preferably, the diffractive and refractive properties are further selected such that the amount of defocus due to wavelength variations in $\lambda_1$ of $\Delta\lambda=2$ nm is below 0.03 $\lambda_1$.

This ensures that the amount of defocus due to fast wavelength variations as a result of switching the power of the laser during write operation is limited as the defocus arising from these fast wavelength variation cannot be compensated by a focus actuator.

Preferably, the sawtooth-like pattern elements have a width of at least 10 $\mu$m.

This ensures an easy manufacturability in a single-step replication process. The grating structure may be incorporated into the mould by a finite-sized turning tool.

According to another aspect of the present invention there is provided an optical scanning device for scanning optical record carriers of a first and second format by radiation of a first and second wavelength $\lambda_1$ and $\lambda_2$, respectively, the device including an optical objective lens with at least one refractive and one diffractive element, wherein the refractive and diffractive properties are selected such that diffractive orders $m_1$ and $m_2$ of wavelength $\lambda_1$ and $\lambda_2$ are used to scan optical record carriers of said first and second format respectively with: ($m_1$, $m_2$) being one of the following combinations: ($m_1$, $m_2$)=(-2, -2), (-3, -2), (-3, -3) or (-4, -3).

In this way a highly suitable device can be achieved capable of writing and reading optical record carriers of a first and second thickness by radiation of a first and second wavelength $\lambda_1$ and $\lambda_2$, respectively, whilst the (-1, -1) prior art solution is excluded.

Figure 2A:
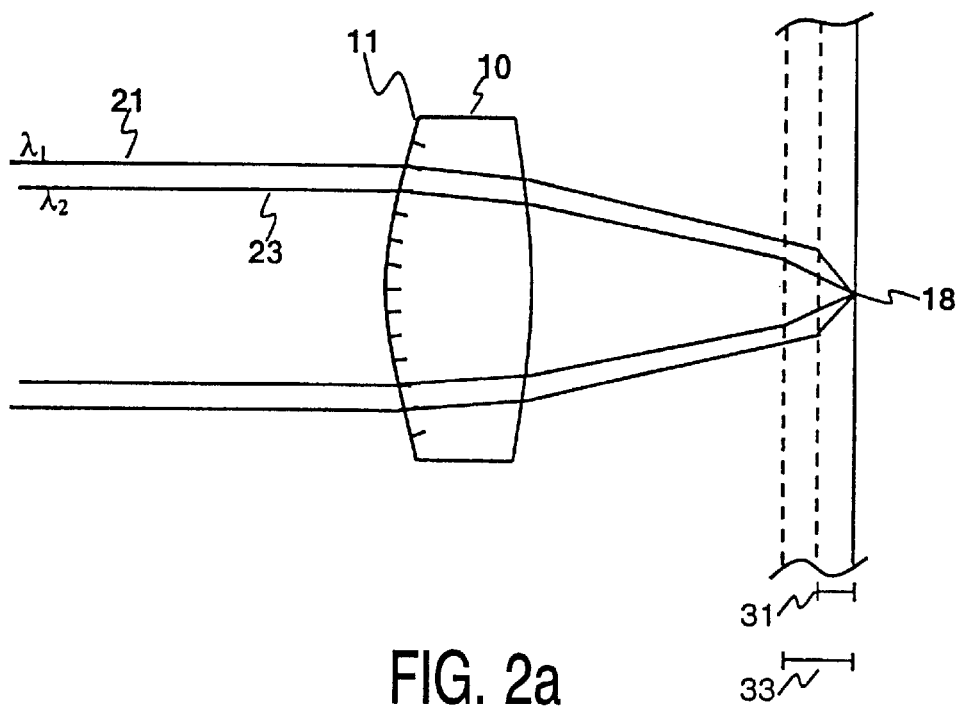
Figure 2B:
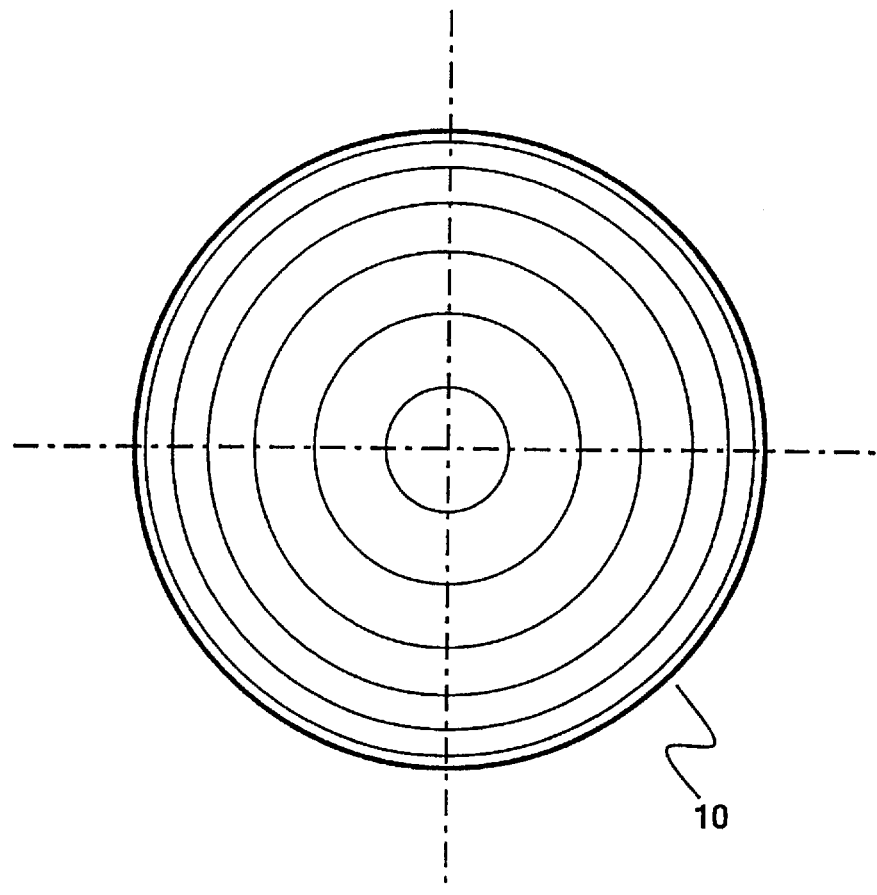

An embodiment of the invention will now be described, by way of example only, with reference to the accompanying drawings, wherein:

FIG. 1 is a schematic illustration of components of a scanning device for optical record carriers according to one embodiment of the present invention, FIG. 2a is a schematic illustration of a single objective lens for use in a scanning device capable of scanning optical record carriers of a first thickness with laser radiation of a first wavelength and a first numerical aperture and record carriers of a second format with laser radiation of a second wavelength and a second numerical aperture; and FIG. 2b is a schematic illustration of the front view of the objective lens, showing the ring-shaped diffractive structure.

FIG. 1 is a schematic illustration of components common to a device in accordance with the embodiment, to be described below, for scanning an optical record carrier 1. The record carrier 1 is in this embodiment an optical disc as will be described, by way of example, below.

The optical disc 1 comprises a transparent layer 2, on one side of which at least one information layer 3 is arranged. The side of the information layer facing away from the transparent layer is protected from environmental influences by a protection layer 4. The side of the transparent layer facing the device is the disc entrance face 5. The transparent layer 2 acts as a substrate for the optical disc by providing mechanical support for the information layer or layers. Alternatively, the transparent layer 2 may have the sole function of protecting the information layer 3, while the mechanical support is provided by a layer on the other side of the information layer, for instance by the protection layer 4 or by a further information layer and transparent layer connected to the uppermost information layer.

Information may be stored in the information layer 3, or information layers, of the optical disc in the form of optically detectable marks arranged in substantially parallel, concentric or spiral tracks, not indicated in FIG. 1. The marks may be in any optically readable form, e.g. in the form of pits, or areas with a reflection coefficient or a direct of magnetisation different from their surroundings, or a combination of these forms.

The scanning device includes a radiation source 6, comprising a tunable semiconductor laser or two separate semiconductor lasers, emitting radiation of a first wavelength and of a second wavelength in a diverging radiation beam 7 towards a lens system. The lens system includes a collimator lens 9 and an objective lens 10 arranged along optical axis 13. The collimator lens 3 transforms the diverging beam 7 emitted from the radiation source 6 into a substantially collimated beam 15. The objective lens 10 comprises a diffractive element, which is indicated in the drawing by the pattern 111 and will be described in more detail below. The objective lens 10 transforms the incident collimated radiation beam 15 into a converging beam 14, having a selected NA, which comes to a spot 18 on the information layer 3. A detection system 16, a second collimator lens 19 and a beam splitter 8 are provided in order to detect data signals, and focus error signals which are used to mechanically adjust the axial position of the objective lens 10.

The diffractive grating 11 as shown in FIGS. 1 and 2A is arranged on the side of the objective lens 10 facing the radiation source. However, it may alternatively be arranged on the other surface of lens 10.

FIG. 2a is a schematic illustration of the objective lens 10 for use in the scanning device described above. The scanning device is capable of scanning optical record carriers with a first thickness of the transparent substrate with laser radiation 21 of a first wavelength $\lambda_1$ at a first numerical aperture $NA_1$. The device is further capable of scanning record carriers with a second thickness of the transparent layer with laser radiation 23 of a second wavelength $\lambda_2$ at a second numerical aperture $NA_2$ using the same optical objective lens 10. Discs of DVD format may be scanned with laser radiation of a first wavelength $\lambda_1$ between say 620 and 700 nm, preferably $\lambda_1$=660 nm. A numerical aperture of about 0.6 is used for reading DVD and an NA above 0.6, preferably approximately 0.65, is applied for writing DVD. Record carriers of CD format are scanned with laser radiation of a second wavelength $\lambda_2$ between say 740 and 820 nm, preferably $\lambda_2$=780 nm with a numerical aperture of below 0.5, preferably 0.45. The objective lens 10 corrects for spherical aberration caused by the difference in thickness 31 and 33 of the transparent layers of a DVD and CD carrier, respectively. The lens similarly corrects for spherochromatism and chromatic aberration as will be described in more detail below.

In this embodiment of the invention, reading and writing data on discs of a different format (by radiation of wavelength $\lambda_1$ and $\lambda_2$) using a single objective element is achieved by using a hybrid lens, i.e. a lens combining diffractive and refractive elements, in an infinite-conjugate mode. Such a hybrid lens can be formed by applying a grating profile on one of the surfaces of a refractive lens. A robust and inexpensive solution which is easy to manufacture can be achieved by incorporating the diffractive structure into the mould by means of diamond turning. In this way the lens can be manufactured in a single step replication process. The tip dimension of a diamond turning device is typically around 5 $\mu$m. Structures which are smaller than 10 $\mu$m are thus difficult to manufacture and it is advantageous to design an objective lens with pattern elements greater than 10 or preferably 20 $\mu$m. In preferred embodiments an inexpensive high-dispersive glass lens is used.

FIG. 2b is a schematic front view of the objective lens 10 illustrating the diffractive structure according to a preferred embodiment of the invention. It can be seen that a circular grating structure has been applied with a pattern of coaxially ring-shaped pattern elements with gradually increasing width towards the centre of the lens. Each pattern element defines a so-called zone of the diffractive element.

Scanning data with radiation of wavelength $\lambda_1$ and $\lambda_2$ using a single objective lens may for example be achieved by designing the diffractive element of the objective lens in a way that radiation $\lambda_1$ of a selected first diffractive order and radiation $\lambda_2$ of a selected second diffractive order is used for spot formation.

By applying a stepped grating structure radiation of a certain wavelength may be transmitted through the diffractive element ideally without diffraction and thus the fully transmitted zeroth diffractive order can be used to scan data with this wavelength. However, the structures of such a stepped grating profile are much smaller compared to a sawtooth-like grating profile. Manufacturing of such a stepped grating structure for example in a single step replication process would cause losses in transmission efficiency due to roundings of the structure because of the finite tip dimensions of the diamond turning tool. Therefore a sawtooth-like blazed grating structure has been chosen for the embodiments described below. In this case higher diffractive orders $m_1$ and $m_2$ ($m_1$, $m_2$>0) are used for scanning with radiation of wavelengths $\lambda_1$ and $\lambda_2$. In the following a lens design according to embodiments of the invention will be described.

For a blazed diffraction element with blaze height h, the diffraction efficiency in order m when using wavelength $\lambda$ is $$\mathit{eff} = \mathrm{sinc}\left(\frac{\pi h[n(\lambda) - 1]}{\lambda} - \pi m\right), \quad (1)$$

whereby sinc(x) is defined as sinc(x)=sin(x)/x and n is the refraction index of the lens material. The efficiency eff is defined as the transmission efficiency of the intensity of the radiation due to the diffractive process. The optical scanning device should be capable of reading and writing data onto optical record carriers of the first format and thus a very high diffraction efficiency is demanded for radiation of wavelength $\lambda_1$. In order to be able to read data on record carriers of the second format, it is sufficient to achieve a reasonably high efficiency for radiation of wavelength $\lambda_2$. We therefore demand a diffraction efficiency eff>95% at order $m_1$ and wavelength $\lambda_1$, and eff>35% at order $m_2$ and wavelength $\lambda_2$. Together with equation (1) we thus find the relation $$\left|\frac{m_1 \lambda_1}{\lambda_2} \frac{n(\lambda_2) - 1}{n(\lambda_1 - 1)} - m_2\right| < \frac{1.7}{\pi}. \quad (2)$$

Since $n(\lambda_1) \approx n(\lambda_2)$, equation (2) can be approximated by $$\left|\frac{m_1 \lambda_1}{\lambda_2} - m_2\right| < 0.55. \quad (3)$$

The dispersion of a diffractive element is much larger than the dispersion of a refractive element, and has the opposite sign. Thus an achromatic hybrid lens may be designed by combining refractive and diffractive elements. Let $K_0$ be the power of the diffractive lens $K_1$ the power of the refractive lens. For an achromatic hybrid lens with one diffractive and one refractive element, the following relation is fulfilled:

$$\frac{K_0}{V_0} + \frac{K_1}{V_1} = 0, \quad (4)$$

where $V_i$ are the Abbe numbers. As a consequence of the opposite signs for the refractive and diffractive dispersion, the grating profile should extend over the full aperture used for $\lambda_1$-radiation and should not be limited to the smaller $\lambda_2$ aperture. In a conventional lens the range of possible wavelength variations introduces an amount of defocus that can be corrected mechanically by a lens actuator. In an hybrid lens, however, the overall dispersion is much larger. A lens with its diffractive element limited to the central region of the $\lambda_2$ aperture would experience different amounts of defocus in this central region and the peripheral region. For scanning data with radiation of $\lambda_1$, both the central region and the peripheral region are being used, and to avoid spot deterioration, the diffractive element is thus extended over the full $\lambda_1$ aperture.

In order to enable operation of the lens for both wavelengths $\lambda_1$ and $\lambda_2$ in an infinite-conjugate manner, the spherical aberration caused by the disc thickness difference is compensated for by spherical aberration introduced by the diffractive element resulting from the use of wavelengths $\lambda_1$ and $\lambda_2$ and diffractive orders $m_1$ and $m_2$.

A rotationally symmetric diffractive element can be described by a phase function of the form $$\phi(r) = Ar^2 + Gr^4 + \ldots, \quad (5)$$

with r being the radial co-ordinate and A and G being the diffractive power coefficient related to chromatic and spherical aberration, respectively. The position $r_i$ where each zone starts is then given by $$\phi(r_i) = 2\pi i. \quad (6)$$

The main term contributing to the spherical aberration generated by the diffractive element (having weak power) is $$W = \frac{\lambda m G}{\pi} F^4 NA^4, \quad (7)$$

with F being the focal length and NA the numerical aperture of the hybrid lens. The difference in spherical aberration when used at $\lambda_1$, $m_1$ and $\lambda_2$, $m_2$ is then given by $$\delta W = (\lambda_2 m_2 - \lambda_1 m_1) \frac{GF^4 NA^4}{\pi}. \quad (8)$$

The spherical aberration arising due to the disc thickness difference $\Delta d$ between discs of the first and second format is $$\Delta W_{disc} = \frac{n_p^2 - 1}{8 n_p^3} \Delta d NA^4, \quad (9)$$

with $n_p$ being the refractive index of the disc. To compensate for this aberration we aim for $\epsilon W + \Delta W_{disc} = 0$ and hence, using equation (8) and (9), $$|G| = \left| \frac{(n_p^2 - 1) \pi \Delta d}{8 n_p^3 F^4 (\lambda_2 m_2 - \lambda_1 m_1)} \right|. \quad (10)$$

The sensitivity of the system to wavelength variations is also preferably limited. As stated above, the spread in wavelength due to manufacturing tolerances for mass produced laser is about 5 to 10 nm. For a hybrid lens this not only causes defocus due to a change in power of the lens, but also spherochromatism. The root mean square of the optical path difference (OPD) introduced by the spherochromatism by wavelength variation $\Delta \lambda$ for radiation of diffractive order $m_1$ is given by $$OPD \approx \frac{F^4 NA^4}{\pi \sqrt{180}} |G m_1 \Delta \lambda|. \quad (11)$$

We demand a limited spherochromatism of OPD<0.03$\lambda$ for scanning data with wavelength $\lambda_1$. Because the numerical aperture NA for scanning with $\lambda_2$ is substantially smaller than for scanning with $\lambda_1$, the spherochromatism for wavelength $\lambda_2$ is less severe. Using equation (10) and (11) we thus find $$\left| \frac{NA^4 (n_p^2 - 1) \Delta d m_1 \Delta \lambda}{8 \sqrt{180 n_p^3 (\lambda_2 m_2 - \lambda_1 m_1)}} \right| < 0.03\lambda, \quad (12)$$

and hence $$\left| \frac{NA^4 (n_p^2 - 1) \Delta d m_1 \Delta \lambda}{3.22 n_p^3 \lambda_1 \lambda_2} \right| < \left| m_2 - \frac{\lambda_1}{\lambda_2} m_1 \right|. \quad (13)$$

For $\lambda_1$=660 nm, $\lambda_2$=780 nm, $\Delta\lambda$=5 nm, $\Delta d$=0.6 mm, $n_p$=1.58 and NA=0.65, we finally get the following relation (for $|m_1|>0$):

$$0.12 |m_1| < |m_2 - 0.84 m_1|. \quad (14)$$

Combining this with the efficiency demand of equation (3) we find (for $|m_1|>0$):

$$0.12 |m_1| < |m_2 - 0.84 m_1| < 0.55. \quad (15)$$

In order to have positive zone spacings ($r_i$>0) the coefficient A must be positive. Furthermore, the power $K_0$ of the diffractive element is given by $$K_0 = -\frac{\lambda m A}{\pi}. \quad (16)$$

In order to make the lens design achromatic $K_0$ should be positive. Therefore, m should be negative. The only combinations of diffractive orders fulfilling condition (15) are then $$(m_1, m_2) = (-1, -1), (-2, -2), (-3, -2), (-3, -3) \text{ and } (-4, -3). \quad (17)$$

Finally, we note that when $$\frac{m_2 - \lambda_1 m_1 / \lambda_2}{m_2} < 0 \quad (18)$$

then A/G<0. The zone spacing is larger when A/G<0 than when A/G>0. A larger zone spacing is preferable because it makes manufacturing of the element more efficient.

Optical objective lenses are then designed with help of a commercially available lens design software, such as ZEMAX™, whereby the diffractive orders $m_1$ and $m_2$ used to scan at wavelengths $\lambda_1$ and $\lambda_2$ are selected in accordance to the solution given in equation (17). A set of parameters, like the wavelengths $\lambda_1$ and $\lambda_2$, the focal length F, the dimensions of the lens, etc., are specified and the lens design is optimised by the program using a derived merit function to minimise the resulting amount of defocus due to fast wavelength variations, spherical aberration and spherochromatism.

In the following five different examples for lens designs are described, one for each of the five solutions of ($m_1$, $m_2$) given in equation (17).

In the five embodiments to be described below radiation of wavelength $\lambda_1$=660 nm and $\lambda_2$=780 nm is used to scan discs of DVD and CD format, respectively. Discs of DVD and CD format are made of polycarbonate and have a refractive index of 1.5796 at $\lambda_1$ and 1.5733 at $\lambda_2$. The optical system of these examples changes the parallel beam of radiation with wavelength $\lambda_1$ and $\lambda_2$ in a converging beam of NA=0.65 and 0.45, respectively. The objective lens has in all five embodiments one aspherical and one planar surface. The aspherical surface is realised by applying a thin acrylic layer on top of a glass lens body with a convex surface. The free working distance $fwd_1$ in the $\lambda_1$-configuration is listed in Table 2 for the five examples. The lens has a thickness on the optical axis of 2.53 nm and an entrance pupil diameter of 3.58 mm. The lens body is made of SFL56 Schott glass with a refractive index of n=1.7757 for $\lambda_1$ and an Abbe number of 26. The convex surface of the lens body which is directed towards the collimator lens has a radius of 2.43 mm. The acrylic layer has a refractive index of n=1.5640 for $\lambda_1$ and an Abbe number of 30. The thickness of this layer on the optical axis is 19 $\mu$m. The rotational symmetric aspherical shape can be described by the equation $$z(r) = B_2 r^2 + B_4 r^4 + B_6 r^6 + \ldots,$$

with z being the position of the surface in the direction of the optical axis in millimeters, r the distance to the optical axis in millimeters, and $B_k$ the coefficient of the k-th power of r. The values of the coefficients $B_2$ to $B_{16}$ are listed in Table 1 for the five embodiments described.

The phase $\phi(r)$ introduced by the diffractive structure is given by $$\phi(r)=m(Ar^2+Gr^4+Hr^6+\ldots),$$

where m is the diffractive order, r the distance to the optical axis in millimeters and the coefficients A, G and H are listed in Table 2 for the five embodiments described.

The phase function introduced by the diffractive element may be approximated by:

$$\phi(r)=|Ar^2+Gr^4|m$$

In embodiments of the invention, the coefficients A and G preferably fulfil the following conditions:

$$10/(F \cdot mm) < |A| < 1000/(F \cdot mm); \text{ and}$$

$$50/F^4 < |G \cdot (m_2 - \lambda_1 m_1 / \lambda_2)| < 5000/F^4,$$

where F is the focal length.

More preferably, coefficients A and G are in the following ranges:

$$50/(F \cdot mm) < |A| < 500/(F \cdot mm) \text{ and}$$

$$200/F^4 < |G \cdot (m_2 - \lambda_1 m_1 / \lambda_2)| < 1000/F^4.$$

For radiation of wavelength $\lambda_2$ the entrance pupil diameter $epd_2$ and the free working distance $fwd_2$ are listed in Table 2 for the five different examples. The refractive index for the lens body is n=1.7658 for $\lambda_2$ and for the acrylic layer n=1.5588 for $\lambda_2$.

TABLE 1

Coefficients describing the refractive surface

| | | | | | refractive surface | | | | |
|---|---|---|---|---|---|---|---|---|---|
| Example | $(m_1, m_2)$ | $B_2$ [1/mm$^2$] | $B_4$ [1/mm$^4$] | $B_6$ [1/mm$^6$] | $B_8$ [1/mm$^8$] | $B_{10}$ [1/mm$^{10}$] | $B_{12}$ [1/mm$^{12}$] | $B_{14}$ [1/mm$^{14}$] | $B_{16}$ [1/mm$^{16}$] |
| 1 | (−1, −1) | 0.2398 | −3.265E−3 | −1.641E−4 | 1.011E−3 | −3.322E−4 | 2.129E−5 | 1.224E−5 | −2.075E−6 |
| 2 | (−2, −2) | 0.2325 | −4.217E−3 | 6.694E−4 | 4.836E−4 | −2.369E−4 | 6.016E−5 | −6.795E−6 | 1.714E−7 |
| 3 | (−3, −2) | 0.2166 | 1.192E−2 | −1.421E−3 | 2.678E−4 | −9.543E−5 | 8.476E−6 | 0 | 0 |
| 4 | (−3, −3) | 0.2315 | −2.240E−3 | −4.862E−4 | 9.219E−4 | −3.879E−4 | 9.973E−5 | −1.567E−5 | 1.163E−6 |
| 5 | (−4, −3) | 0.2022 | 1.863E−2 | −2.431E−3 | 4.926E−4 | −3.571E−4 | 1.121E−4 | −1.922E−5 | 1.351E−6 |

TABLE 2

Coefficients describing the diffractive surface, the free working distance at the entrance public diameter

| | | diffractive surface | | | | | |
|---|---|---|---|---|---|---|---|
| Example | $(m_1, m_2)$ | A [1/mm$^2$] | G [1/mm$^4$] | H [1/mm$^6$] | $fwd_1$ | $fwd_2$ | $epd_2$ |
| 1 | (−1, −1) | 29.935 | 53.291 | −8.374 | 0.945 | 0.574 | 2.446 |
| 2 | (−2, −2) | 34.572 | 27.877 | −3.994 | 0.775 | 0.390 | 2.495 |
| 3 | (−3, −2) | 54.681 | −12.147 | 1.903 | 1.038 | 0.731 | 2.495 |
| 4 | (−3, −3) | 24.648 | 16.304 | −1.948 | 0.772 | 0.388 | 2.495 |
| 5 | (−4, −3) | 58.449 | −19.027 | 3.286 | 0.941 | 0.619 | 2.495 |

TABLE 3

Properties of examples of the set of solutions given in (17).

| | $\lambda_1$ | | | $\lambda_2$ | | | |
|---|---|---|---|---|---|---|---|
| $(m_1, m_2)$ | defocus for $\Delta\lambda$ = 2 nm | spherochromatism for $\Delta\lambda$ = 5 nm | eff | higher order aberration due to thickness difference | eff | # zones | smallest zone |
| (−1, −1) | 6.2 mλ | 8.1 mλ | 97% | 22.2 mλ | 91% | 59 | 14 μm |
| (−2, −2) | 27.5 mλ | 8.7 mλ | 95% | 24.2 mλ | 78% | 42 | 20 μm |
| (−3, −2) | 12.4 mλ | 16.8 mλ | 95% | 20.0 mλ | 45% | 18 | 52 μm |

TABLE 3-continued

Properties of examples of the set of solutions given in (17).

| ($m_1$, $m_2$) | $\lambda_1$ defocus for $\Delta\lambda$ = 2 nm | $\lambda_1$ spherochromatism for $\Delta\lambda$ = 5 nm | eff | $\lambda_2$ higher order aberration due to thickness difference | eff | # zones | smallest zone |
|---|---|---|---|---|---|---|---|
| (−3, −3) | 28.3 m$\lambda$ | 12.0 m$\lambda$ | 95% | 27.8 m$\lambda$ | 60% | 29 | 25 $\mu$m |
| (−4, −3) | 8.9 m$\lambda$ | 23.3 m$\lambda$ | 95% | 23.0 m$\lambda$ | 68% | 16 | 50 $\mu$m |

The first column gives the diffractive orders $m_1$ and $m_2$ used for the first and second wavelengths $\lambda_1$ and $\lambda_2$, respectively. In the second column the amount of defocus is given for wavelength variations of $\Delta\lambda$=2 nm. Very fast wavelength variations of $\Delta\lambda$=2 nm may result from a change in the power of the laser during a writing process. The resulting amount of defocus is less than 0.03$\lambda_1$ for all five embodiments. This ensures that record carriers are written properly with radiation of $\lambda_1$ as the lens focusing actuator itself cannot compensate for the resulting defocus because the variations are too fast. The third column shows the amount of spherochromatism caused by wavelength variations of $\Delta\lambda$=5 nm as for example caused by manufacturing tolerances of the laser. The resulting values are all below 0.03$\lambda_1$. In the fourth and sixth column the diffraction efficiencies for radiation of the two wavelengths $\lambda_1$ and $\lambda_2$ are given. The fifth column gives the amount of higher order aberration due to the disc thickness difference for scanning at a wavelength $\lambda_2$. Again the resulting values are below 0.03$\lambda_2$, which ensures proper scanning of record carriers with radiation of wavelength $\lambda_2$. In the seventh and eighth column the total number of zones of the objective lens and the zone spacing of the smallest zone are given.

Whilst in the above described embodiment a scanning device for scanning carriers of DVD and CD format is described, it is to be appreciated that the scanning device can be alternatively used for any other types of optical record carriers to be scanned. Whilst in the above described embodiment 660 nm and 780 nm laser radiation is used, it is to be appreciated that radiation of any other combinations of wavelengths suitable for scanning optical record carriers may be used.

What is claimed is:

1. An optical scanning device for scanning first and second optical record carriers with a first and a second information layer depth by radiation of a first wavelength $\lambda_1$, and a second wavelength $\lambda_2$, respectively,
   said device being capable of reading and writing optical record carriers of said first format,
   the device including an objective lens (10) with at least one refractive element and at least one diffractive element (11) and with a numerical aperture NA of NA>0.60 for said first wavelength $\lambda_1$,
   said diffractive element including a pattern of generally sawtooth-like elements;
   wherein the diffractive and refractive properties of the objective lens are selected:
   such that radiation of said first wavelength is transmitted and focused on optical record carriers of said first thickness;
   such that radiation of said second wavelength is transmitted and focused on optical record carriers of said second thickness; and
   such that a variation in wavelength $\lambda_1$ of 5 nm results in spherochromatism below 0.03$\lambda_1$.

2. An optical scanning device according to claim 1, wherein 620 nm <$\lambda_1$<700 nm and 740 nm <$\lambda_2$<820 nm.

3. An optical scanning device according to claim 1, wherein the diffractive and refractive properties are further selected such that the amount of defocus due to wavelength variations in $\lambda_1$ of $\Delta\lambda$=2 nm is below 0.03 $\lambda_1$.

4. An optical scanning device according to claim 1, wherein said sawtooth-like pattern elements have a width of at least 10 $\mu$m.

5. An optical scanning device according to claim 1, wherein a difference in information layer depth of $\Delta$d of said optical record carriers is between 0.5 and 0.7 mm and the diffractive and refractive properties are further selected such that the spherical aberration caused by $\Delta$d is substantially compensated by spherical aberration of the diffractive element caused by the use of a wavelength $\lambda_1$ and $\lambda_2$ and a diffractive order $m_1$ and $m_2$ to scan optical record carriers of said first and second format, respectively, whereby an accuracy in compensation for scanning record carriers of said second format with $\lambda_2$ of better than 0.03$\lambda_2$ is achieved.

6. An optical scanning device according to claim 1, wherein the diffractive and refractive properties are further selected such that a diffraction efficiency for scanning record carriers of said first and second format with radiation of wavelength $\lambda_1$ and $\lambda_2$ of at least 95% and 35%, respectively, is achieved.

7. An optical scanning device according to claim 1, wherein one of the following diffractive orders $m_1$ and $m_2$ for said first radiation of wavelength $\lambda_1$ and second wavelength $\lambda_2$ are used to scan optical record carriers of said first and second format, respectively:
   ($m_1$, $m_2$)=(−1, −1,), (−2, −2), (−3, −2), (−3, −3) or (−4, −3).

8. An optical scanning device according to claim 1, wherein said sawtooth-like pattern elements have a width of at least 50 $\mu$m, and is adapted for the use of one of the following combinations of diffractive orders $m_1$ and $m_2$ to scan optical record carriers of said first and second format with radiation of wavelength $\lambda_1$ and $\lambda_2$, respectively:
   ($m_1$, $m_2$)=(−3, −2) and (−4, −3).

9. An optical scanning device according to claim 1, wherein said objective lens includes a high-dispersive glass material.

10. An optical scanning device according to claim 1, wherein said objective lens is used in an infinite-conjugate mode for scanning record carriers of said first and second format.

11. An optical scanning device for scanning optical record carriers of a first and second format by radiation of a first and second wavelength $\lambda_1$ and $\lambda_2$, respectively, the device including an optical objective lens with at least one refractive and one diffractive element, wherein the refractive and diffractive properties are selected such that diffractive orders $m_1$ and $m_2$ of wavelength $\lambda_1$ and $\lambda_2$ are used to scan optical record carriers of said first and second format respectively with:

$(m_1, m_2)$ being one of the following combinations:

$(m_1, m_2) = (-2, -2), (-3, -2), (-3, -3)$ or $(-4, -3)$.

* * * * *